(No Model.)
H. A. HARVEY.
FLANGED METAL TIRE FOR CAR OR LOCOMOTIVE WHEELS.
No. 560,161. Patented May 12, 1896.
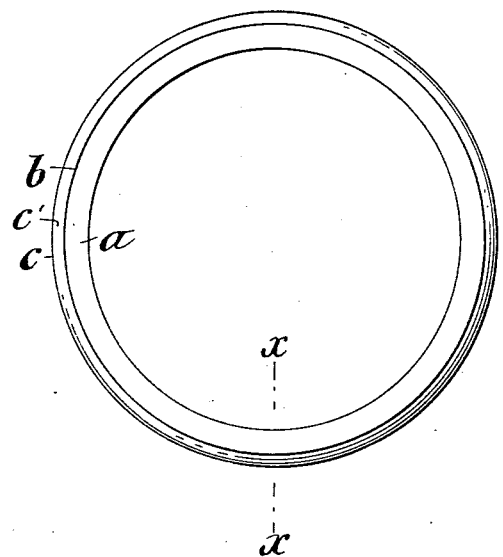
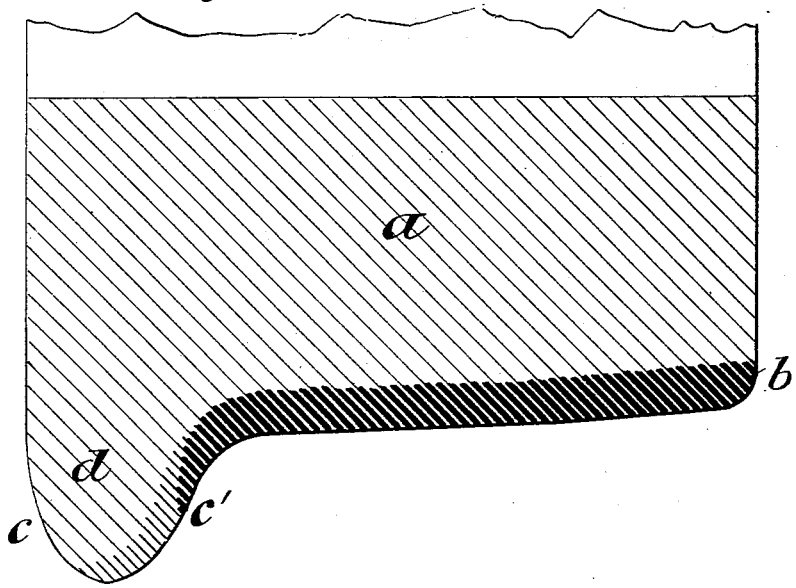
Witnesses
A. M. Jones.
E. Gatterer.
Inventor.
Hayward A. Harvey,
Per Edw. E. Quimby,
Atty.

UNITED STATES PATENT OFFICE.

HAYWARD A. HARVEY, OF ORANGE, NEW JERSEY, ASSIGNOR TO THE HARVEY STEEL COMPANY, OF NEWARK, NEW JERSEY.

FLANGED METAL TIRE FOR CAR OR LOCOMOTIVE WHEELS.

SPECIFICATION forming part of Letters Patent No. 560,161, dated May 12, 1896.

Application filed November 21, 1895. Serial No. 569,646. (No model.)

*To all whom it may concern:*

Be it known that I, HAYWARD A. HARVEY, of Orange, New Jersey, have invented a certain Improvement in Flanged Steel Tires for Car or Locomotive Wheels, of which the following is a specification.

This improvement, which is intended for use on a car or locomotive wheel composed of steel, consists of a flanged tire, the metal in the main body of which is tough and is integral with excessively hard metal upon the face or tread of the tire, while the side of the flange adjacent to the face or tread of the tire is composed of less excessively hard metal.

The accompanying drawings, conventionally representing a flanged tire embodying the improvement, are as follows:

Figure 1 is a side elevation. Fig. 2 is a transverse section taken through the plane indicated by the dotted line $x\ x$ on Fig. 1.

The drawings conventionally represent a tire, the main body $a$ of which is composed of a tough metal, such as low-carbon steel, and is integral with an exterior stratum $b$ upon the face or tread of the tire, which is composed of a relatively high-carbon steel. The flange $c$ on the side $c'$ adjacent to the tread of the tire is composed of steel relatively lean in carbon as compared with the stratum $b$ of metal forming the tread, and is integral with the body of metal $d$, composed of steel containing approximately the same percentage of carbon as that contained in the main body $a$ of the tire. The tire thus composed, upon being chilled in the usual manner, exhibits the following characteristics: The face or tread is excessively hard, the side of the flange adjacent to the tread is somewhat less hard, and the remaining portion of the metal is comparatively soft and tough. It hence results that while the metal upon the surface of the flange adjacent to the tread is given increased wearing capacity by being somewhat hardened it is not so hardened as to render the flange brittle enough to break when in use.

The required condition of variable distribution of carbon in different parts of the tire is established by first making the tire of low-carbon steel—that is, of steel containing any desired low percentage of carbon—and then subjecting it to high heat while its face or tread is maintained in contact with a body of material rich in carbon, such as powdered charcoal, and the side of its flange adjacent to the tread is maintained in contact with a material relatively lean in carbon until the desired supercarburization is effected.

It is not necessary to herein describe in further detail the process of effecting the required variable distribution of the carbon in the tire, because the said process forms no part of the present invention, and also because it is amply described and claimed in H. A. Harvey's pending application, Serial No. 565,160, filed October 9, 1895.

What is claimed as the invention is—

The herein-described new article of manufacture, the same consisting of a flanged steel tire for car and locomotive wheels, the metal in the main body of which tire is comparatively tough, the metal composing the face or tread is excessively hard, and the metal upon the side of the flange adjacent to the tread is less hard than the metal of the tread, but harder than the metal composing the main body of the tire.

HAYWARD A. HARVEY.

Witnesses:
   A. W. JONES,
   E. GATTERER.